United States Patent
Soto

(10) Patent No.: US 12,095,406 B2
(45) Date of Patent: Sep. 17, 2024

(54) WIND TURBINE ELECTRICAL POWER GENERATING SYSTEM AND METHOD

(71) Applicant: Siemens Gamesa Renewable Energy Innovation & Technology S.L., Sarriguren (ES)

(72) Inventor: Daniel Soto, Hamburg (DE)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 17/928,298

(22) PCT Filed: May 7, 2021

(86) PCT No.: PCT/EP2021/062238
§ 371 (c)(1),
(2) Date: Nov. 29, 2022

(87) PCT Pub. No.: WO2021/244823
PCT Pub. Date: Dec. 9, 2021

(65) Prior Publication Data
US 2023/0246575 A1 Aug. 3, 2023

(30) Foreign Application Priority Data
Jun. 4, 2020 (EP) .................................. 20382486

(51) Int. Cl.
*H02P 9/00* (2006.01)
*H02J 3/38* (2006.01)
*H02M 7/04* (2006.01)

(52) U.S. Cl.
CPC .............. *H02P 9/007* (2013.01); *H02J 3/381* (2013.01); *H02J 2300/28* (2020.01); *H02M 7/04* (2013.01)

(58) Field of Classification Search
CPC ....... H02P 9/007; H02J 3/381; H02J 2300/28; H02M 7/04; Y02E 10/72
See application file for complete search history.

(56) References Cited

U.S. PATENT DOCUMENTS

| 7,554,302 B2* | 6/2009 | Schauder | H02P 23/08 322/59 |
| 2008/0296898 A1* | 12/2008 | Ichinose | H02P 29/0241 290/44 |
| 2020/0282819 A1* | 9/2020 | Spierling | H02P 5/68 |

FOREIGN PATENT DOCUMENTS

| CN | 101 950 981 A | 1/2011 |
| WO | 03/008802 A1 | 1/2003 |
| WO | 2015/183353 A1 | 12/2015 |

OTHER PUBLICATIONS

International Search Report and Written Opinion for PCT/EP2021/062238 issued on Jul. 6, 2021.
(Continued)

*Primary Examiner* — Julio C. Gonzalez
(74) *Attorney, Agent, or Firm* — Schmeiser, Olsen & Watts LLP

(57) ABSTRACT

A wind turbine electrical power generating system is provided and is configured to supply generated electrical power to a main load. The system includes a wound rotor induction generator including stator windings and a generator rotor with rotor windings. The generator rotor is configured to be mechanically coupled to a wind turbine rotor of the wind turbine to receive rotational mechanical energy. A first converter is electrically coupled to the stator windings such that in operation, AC electrical power generated by the stator windings and provided to the main load passes through the first converter. A second converter is electrically coupled to the rotor windings of the generator rotor, wherein an AC frequency of the generated AC electrical power is at least (Continued)

partially determined by setting or controlling currents in the rotor windings of the generator rotor by the second converter.

14 Claims, 2 Drawing Sheets

(56) References Cited

OTHER PUBLICATIONS

Bauer P et al: "Evaluation of electrical systems for offshore windfarms", Industry Applications Conference, 2000. Conference Record of The 2000 IEEE Oct. 8-12, 2000, Piscataway, NJ' USA, IEEE, vol. 3, Oct. 8, 2000.

\* cited by examiner

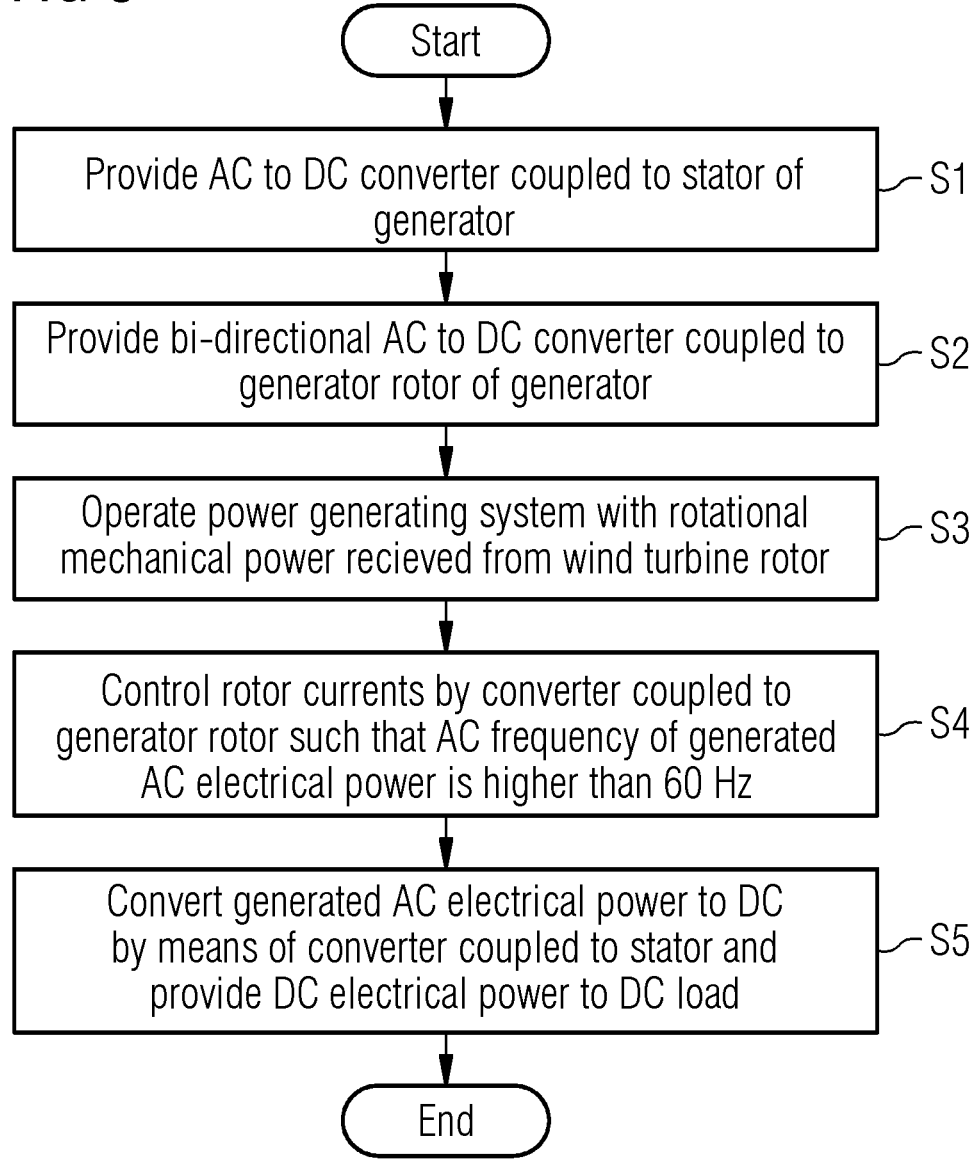

WIND TURBINE ELECTRICAL POWER GENERATING SYSTEM AND METHOD

CROSS-REFERENCE TO RELATED APPLICATIONS

This application claims priority to PCT Application No. PCT/EP2021/062238, having a filing date of May 7, 2021, which claims priority to European Application No. 20382486.7, having a filing date of Jun. 4, 2020, the entire contents both of which are hereby incorporated by reference.

FIELD OF TECHNOLOGY

The following relates to a wind turbine electrical power generating system configured to supply generated electrical power to a main load, the system including a wound rotor induction generator. The following further relates to a method of operating a wind turbine electrical power generating system.

BACKGROUND

Modern variable speed wind turbines have several advantages over conventional fixed speed wind turbines. They in particular allow the extraction of more energy from wind at lower wind speeds. Two solutions have found widespread application: Doubly-fed induction generator (DFIG) solutions and Full Converter (FC) solutions. In the case of the DFIG solution, the stator of the generator is connected to the grid without any intervening power converter, whereas the rotor of such DFIG is connected to a power converter that can provide torque control. Such solution has advantages regarding the efficiency of power generation, since only a fraction of the generated electrical power has to pass through the power converter, thereby reducing losses. Furthermore, the power converter can be rated for lower powers, so that its size and costs are reduced.

Such DFIGs often have a nominal operating speed of about 1200 rpm, they generally operate not higher than 1500 rpm. The generators are generally designed such that at the nominal operating speed, they provide electrical power at the desired grid frequency (50 Hz or 60 Hz) with only little generator slip. Such types of variable speed electrical generators are however associated with relatively low power density and relatively high costs. At the limited rotational speed, the electromagnetic force (EMF) that can be generated is likewise limited, resulting in relatively bulky machines—being required to produce the desired power output. Furthermore, when operating at low generator speed, it may be necessary to provide a voltage step-up. This can for example be done by boosting the terminal voltages using reactances and static switches. Such measures increase the electrical losses and furthermore result in more bulky machines.

On the other hand, the rotational speed of such generators is limited due to gearbox limitations. The relatively low rotational speed of the wind turbine rotor cannot efficiently be increased to any desired speed without leading to further disadvantages.

It is therefore desirable to provide a more compact solution that is capable of efficiently generating electrical power.

The document EP 1 407 141 A1 describes a method and device for speed-variable power electronic adjustment of one or more gearless wind power plants in particular offshore wind power plants located near the coast comprising a wind turbine with a generator unit consisting of a synchronous generator and a field regulator.

The document of INDUSTRY APPLICATIONS CONFERENCE, 2000, CONFERENCE RECORD OF THE 2000 IEEE 8-12, OCTOBER 2000, PISCATAWAY, NJ, USA, IEEE, vol. 3, 8 Oct. 2000 (2000-10-08), pages 1416-1423, XP010521303, ISBN: 978-0-7803-6401-1 describes an inventory of electrical systems in wind turbines. The first part concerns types of generators, the second part focuses on the transmission of the electric power to shore.

SUMMARY

An aspect relates to improving the generation of electrical power by a wind turbine. There is in particular a need to make the generator or the power generating solution more compact.

According to an embodiment, a wind turbine electrical power generating system configured to supply generated electrical power to a main load is provided. The main load may in particular be a load that is external to the wind turbine such as a collector grid or wind farm grid, or a power grid. The electrical power generating system comprises a wound rotor induction generator (WRIG) comprising stator windings and a generator rotor with rotor windings. The generator rotor is configured to be mechanically coupled to a wind turbine rotor of the wind turbine to receive rotational mechanical energy. A first converter is electrically coupled to the stator windings such that in operation, AC (alternating current) electrical power generated by these stator windings and provided to the main load passes through the first converter. The first converter is in particular an AC to DC converter that is configured to provide a conversion of the AC electrical power generated by the stator windings to DC (direct current) electrical power. A second converter is further electrically coupled to the rotor windings of the generator rotor. An AC frequency of the generated AC electrical power is at least partially determined by setting or controlling currents in the rotor windings of the generator rotor by the second converter.

Such configuration may allow an operation of the WRIG at higher output AC frequencies, which do not need to correspond to the grid frequency of the power grid. In particular, since the output of the stator windings of the WRIG is converted to DC electrical power by the first converter, the generator can be operated at significantly higher output frequencies. Accordingly, this allows the use of a smaller generator, since the EMF that is induced by a faster changing electromagnetic field is higher. Higher output voltages can thereby be achieved without requiring a higher number of wire turns of the windings. As at higher frequencies, the change in flux is higher, the flux surface may also be reduced, so that the volume of the generator can be reduced. By allowing the usage of higher frequencies at the output of the generator, the generator provides a higher power density, and has a lower footprint and a higher material utilization rate than the generators of conventional wind turbines.

The second converter may in particular be configured to set the frequency or to adjust the frequency of the rotor current to at least partially determine the AC frequency of the generated electrical power. It should be clear that if the second converter sets the rotor currents at a constant frequency, the AC frequency of the generated electrical power may vary with changes in the rotational speed of the rotor, for example as the wind speed changes. However, as the output of the generator is converted by the first converter to DC electrical power, such changes in frequency do not affect the power generating capability of the electrical power generating system. In operation, the rotor windings of the generator may likewise generate AC electrical power that may be fed via the second converter to the main load.

The second converter is a DC to AC converter configured to control a frequency of the currents in the rotor windings of the generator rotor. It may in particular be a bi-directional converter that enables a bi-directional power flow, for example by also providing conversion of the AC electrical power generated in the rotor windings into DC electrical power.

In an embodiment, the electrical power generating system is configured such that the AC frequency of the AC electrical power generated by the stator windings of the wound rotor induction generator is higher than 60 Hz, higher than 62 or 65 Hz. It may even be higher than 70 Hz, 80 Hz or 100 Hz. The generator accordingly generates in operation the AC electrical power at a frequency that is higher than the conventional grid frequency of 50 or 60 Hz. As indicated above, such higher output frequency results in a higher EMF being produced, leading to a higher output voltage and to a smaller footprint of the generator.

An output AC frequency of a respective value may for example be achieved by operating the generator in a super-synchronous mode, wherein the currents in the generator rotor are controlled in phase and frequency so as to achieve the desired AC frequency of the generated AC electrical power. Additionally or alternatively, the generator may be configured to provide such higher AC frequency at its output, for example by increasing the number of generator poles. The generator may for example be provided with more than three, for example four, five, six or more pole pairs per phase in the stator.

The AC frequency of the AC electrical power generated by the stator windings may for example lie in a range of 62 Hz to 500 Hz, and in the range of 65 Hz to 400 Hz. It may also lie in a range of 70 Hz to 400 Hz or 100 Hz to 400 Hz.

The second converter may be configured to control the AC frequency of the AC electrical power generated in the stator windings by controlling a frequency of the currents in the rotor windings. The second converter may in particular control the frequency of the currents in the rotor windings such that the AC frequency of the generated AC electrical power lies above the above-mentioned limits or within the above-mentioned ranges.

The AC frequency of the generated AC electrical power may further be determined by the phase of the rotor currents (sub-synchronous and super-synchronous operation) and by the mechanical rotational speed of the rotor.

The power generating system may be configured to control a speed and magnitude of a stator flux state space vector of the stator of the generator by controlling a frequency and magnitude of the currents in the generator rotor in dependence on the mechanical rotational speed of the generator rotor. For example, the system may include sensors to determine the generator rotor speed and position and based on respective sensor signals, control the frequency and magnitude of the rotor currents to achieve the desired stator flux state space vector.

The power generating system may further comprise a controller, in particular a converter controller that is coupled to or forms part of the second converter. The controller may be configured to control semiconductor switches of the second converter in order to set or control the currents in the rotor windings. It may in particular implement the techniques described above and further below for controlling the AC frequency of the generated AC electrical power by controlling rotor current magnitude and frequency.

In an embodiment, the first converter is a passive rectifier comprising diodes, or is a controlled rectifier. For example, the first converter may be an IGBT (Insulated Gate Bipolar Transistor) or thyristor rectifier.

The power generating system may have an output for providing the generated electrical power to the main load. The output is a DC (Direct Current) output that provides DC electrical power to the main load. In an embodiment, the main load is external to the wind turbine. The output may be a power output of the wind turbine. Main load may in particular refer to a load that receives more than 50% of the electrical power generated by the WRIG during operation at nominal conditions.

The second converter may for example be coupled between the wound rotor induction generator and the DC output. Accordingly, power that is generated by the generator rotor may likewise be supplied to the DC output. The first and/or second converter may be directly connected to the DC output. It should be clear that it is likewise conceivable that intervening elements are provided between the respective converter and the DC output, such as circuit breakers or other protective elements, compensation capacitors connected between the DC lines, step-up or step-down converters and the like.

The DC output may be coupled or connected to a wind farm grid, in particular to a DC collector grid of a wind farm. Although the electrical power generated by the generator is converted by the first and second converters, the power generation is still efficient, since it is not converted back to AC electrical power by individual DC to AC converters provided in each wind turbine. Rather, the power generating system may only perform the respective AC to DC conversion of the generated electrical power and then provide the electrical power to the DC connector grid.

The main load may in particular comprise such DC collector grid. The main load may for example include a remote or central DC to AC converter that is coupled to an output of the power generating system via the DC collector grid and that is further coupled to an AC power grid. The DC power produced by several wind turbines may thus be collected using the DC collector grid and may be converted by a common DC to AC converter for being fed into the power grid. The remote (with respect to the wind turbine) or central (with respect to the wind farm) DC to AC converter can thus provide efficient power conversion between the DC collector grid and the AC power grid.

In an embodiment, the wound rotor induction generator is configured such that at a nominal rotational speed of the generator and at synchronous operation, an AC frequency of the AC electrical power generated by the stator windings is higher than 60 Hz, higher than 62 or 65 Hz, more higher than 70 or 80 Hz. Accordingly, the generator may have a configuration such that at synchronous operation (zero slip, corresponding to zero frequency of the rotor voltage) the electrical power is already produced at an AC frequency that is higher than the conventional power grid frequencies. As mentioned above, the AC frequency of the AC electrical power may lie in the range of 62 Hz to 500 Hz, 65 Hz to 400 Hz.

To achieve such higher output frequencies at the mechanical rotational speeds that are commonly used in wind turbines, the stator of the wound rotor induction generator may for example be provided with at least four pole pairs per phase. It should be clear that the generator may have a plural phase output such as a three phase or multi-phase output.

The generator may for example have four, five, six or even more pole pairs per phase. Four pole pairs per phase correspond to eight pole windings per phase. A conventional generator, such as a conventional DFIG, generally has only two or three pole pairs per phase. Accordingly, the generator can achieve a higher output frequency and can thus be provided with a smaller size.

According to a further embodiment, a wind turbine comprising a wind turbine electrical power generating system having any of the configurations described herein is provided. The wind turbine may include a wind turbine rotor that is mechanically coupled to the WRIG to supply mechanical energy to the WRIG.

According to an embodiment of the invention, a wind power plant is provided that comprises at least one wind turbine including a wind turbine electrical power generating system having any of the configurations described herein. The wind power plant further comprises a DC collector grid, wherein the first and second converters of the wind turbine electrical power generating system are coupled to the DC collector grid. AC electrical power generated by the stator and rotor windings of the generator and converted to DC by the first and second converters can thus be provided into the DC collector grid. The wind power plant may further include a DC to AC converter that is remote (or distinct) from the at least one wind turbine and that is coupled between the DC collector grid and an AC power grid. By such DC to AC converter, the generated electrical power collected by the DC collector grid may thus efficiently be provided into an AC power grid, which may be a utility power grid, an island grid or the like.

Such configuration may achieve advantages similar to the ones outlined further above. In particular, the footprint of the generator in the wind turbines may be reduced, and cost-savings may be achieved.

According to a further embodiment of the invention, a method of operating a wind turbine electrical power generating system is provided. The method comprises generating AC electrical power by stator windings of a wound rotor induction generator that comprises the stator windings and a generator rotor with rotor windings. The generator rotor is mechanically coupled to a wind turbine rotor of the wind turbine and receives rotational mechanical energy from the wind turbine rotor. The method further comprises providing the generated electrical power to a main load, wherein the AC generated electrical power passes through a first converter electrically coupled to the stator windings, the first converter being an AC to DC converter that converts the AC electrical power generated by the stator windings to DC electrical power. The method further includes setting or controlling currents in the rotor windings of the generator rotor by a second converter that is electrically coupled to the rotor windings to at least partially determine an AC frequency of the generated AC electrical power. With such method, advantages similar to the ones outlined further above may be achieved.

The generated electrical power may for example be provided as DC power to the main load, which may, as outlined above, be a DC collector grid. In other embodiments, the main load may be an AC load, and the electrical power may be converted back to a (alternating) current.

In an embodiment of the method, the controlling is performed such that the AC frequency of the generated AC electrical power is higher than 60 Hz, higher than 62 or 65 Hz. In particular, such higher frequency output may be provided in operation at nominal rotational speed of the generator.

It should be clear that the method may be performed by a wind turbine electrical power generating system having any of the configurations described herein or by a wind power plant having any of the described configurations. It may include any of the method steps described herein with respect to such power generating system or power plant. Further, the wind turbine electrical power generating system and the wind power plant may be configured to perform any of the embodiments of the method described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 3 is a flow diagram schematically illustrating a method according to an embodiment of the invention.

DETAILED DESCRIPTION

Figure 1:
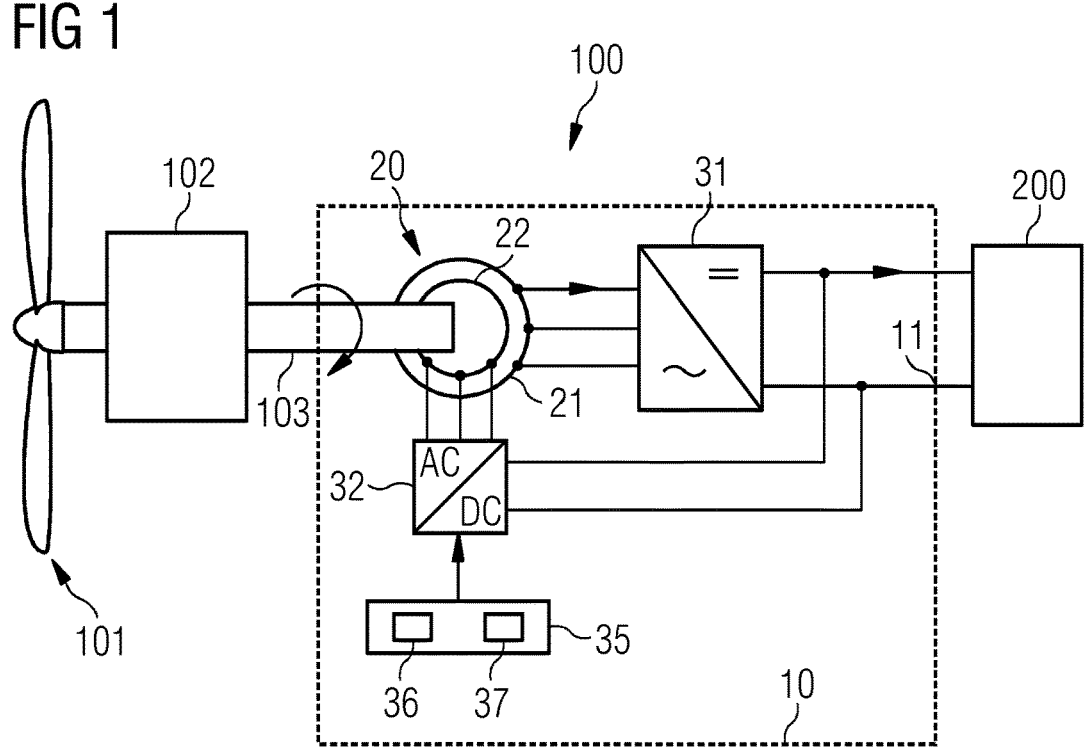
FIG. 1 is a schematic drawing showing a wind turbine electrical power generating system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically shows a wind turbine 100 that includes a wind turbine electrical power generating system 10 (short: power generating system). The power generating system 10 includes a wound rotor induction generator (WRIG) 20, herein designated as generator 20. The wind turbine includes a wind turbine rotor 101 that converts wind energy into rotational mechanical energy. The wind turbine rotor 101 is coupled via a shaft to the gearbox 102. Gearbox 102 increases the rotational speed to a level suitable for the generator 20. Typical rotational speeds lie in the range of 500 to 1500 rpm. The generator 20 is coupled via a shaft 103 to the gearbox 102. In particular, a rotor of the generator that includes rotor windings 22 is connected mechanically to the shaft 103 and is rotated by the shaft. The generator 20 further includes a stator comprising stator windings 21.

In the present example, the generator 20 is a three-phase generator, although it should be clear that the generator may be a multi-phase generator having a different number of phases. The rotor windings 22 include three phase windings that are energized with three phase currents. The rotor currents establish a rotor magnet field. The rotor magnetic field interacts with a stator magnetic field established by the stator windings 21 for the respective phases. The magnetic flux of the rotor field induces in the respective stator windings an electromagnetic force that depends on the derivative of the magnetic flux, i.e., on the change of the flux through the surface of the wire loop of the respective winding. By providing a faster change in the flux, i.e., a higher frequency, a higher flux change (ag/at) is induced, resulting in a higher electromagnetic force. This allows a reduction of the surface enclosed by the wire turns and thus of the volume and/or of the number of wire turns. Embodiments of the present invention employ this effect to operate the generator 20 at higher frequencies to thereby allow the size of the generator to be reduced.

The power generating system 10 is accordingly configured to operate the generator 20 such that the AC frequency of the AC electrical power that is generated by the stator windings 21 is higher than the conventional grid frequency of 50 Hz or 60 Hz, i.e., it is higher than 60 Hz. This may be achieved by providing a particular configuration of the generator 20 and/or by controlling the rotor currents in the rotor windings 22 correspondingly. The power generating system 10 includes a first converter 31 which is an AC (alternating current) to DC (direct current) converter. The stator windings 21 are coupled, directly connected to the first converter 31. It should be clear that a respective connection may be provided for each phase of the stator windings 21. The first converter 31 converts the AC electrical power generated by the stator windings 21 into DC electrical power. Accordingly, the generation of electrical power is not limited to grid frequencies, but the frequency of the generated AC electrical power can be significantly higher. The usage of such higher frequencies than the grid frequency in the stator side of the generator 20 permits a significantly higher power density, resulting in a smaller footprint of the generator 20. This further results in significant cost-savings associated with the generator. Furthermore, the generator 20 requires less space in the nacelle of the wind turbine, resulting in further cost-savings.

The electrical power generating system 10 includes an output 11, which in the example of FIG. 1 is a DC output. It may in particular be the power output of the wind turbine 100. A main load 200 (DC load) is coupled to the DC output 11. Accordingly, the DC electrical power that results from the conversion of the generated AC electrical power is provided via the output 11 to the load 200. The load 200 is in particular a main load that is external to the wind turbine 100. The main load may for example be a DC collector grid of a wind farm or wind power plant. In other embodiments, the main load 200 may be a machine or other equipment that is driven by the produced electrical power. In other configurations, the power generating system 10 may include an additional DC to AC converter and may provide AC electrical power at the output 11. This may then be fed into a conventional wind farm grid.

The power generating system 10 furthermore includes a second converter 32 that is coupled to the rotor windings 22 of the generator 20, in particular directly connected to the rotor windings 22. Via the second converter 32, the rotor windings 22 can be energized to generate the electromagnetic field required for the generation of electrical power by WRIG 20. The second converter 32 is configured to set or to control rotor currents in the rotor windings 22. Converter 32 may for example receive DC electrical power and convert it to AC electrical power that is provided to the rotor windings 22. Furthermore, AC electrical power that is induced in the rotor windings 22 during operation may be converted by the second converter 32 to DC electrical power that is provided to the output 11. Accordingly, the second converter 32 may be configured as a bidirectional converter that can provide DC to AC and AC to DC conversion.

By controlling the frequency and magnitude of the currents in the rotor windings 22, the generator torque can be controlled as well as the AC frequency of the AC electrical power generated by the stator windings 21. The power generating system 10 may comprise a respective controller 35, which can be implemented as a converter controller that may form part of the second converter 32. The controller 35 may comprise a processor 36 coupled to a memory 37. Processor 36 may for example be a digital signal processor, a microprocessor, an application specific integrated circuit (ASIC) or the like. The memory 37 may store control instructions for controlling the second converter 32. The memory may for example include a flash memory, a hard disc drive, RAM, ROM or the like. The control instructions may be configured such that when they are executed by the processor 36, they perform any of the control methods described herein. In particular, the control instructions may provide control of the rotor currents in the rotor windings 22 of the generator 20. It should be clear that the controller 35 may comprise further components, such as input/output interfaces for receiving sensor signals and for outputting control signals to the second converter 32, for example for controlling semiconductor switches of such converter 32. The second converter 32 may perform power conversion by semiconductor switches, such as IGBTs, thyristors, MOSFETs or the like. The controller 35 may for example be coupled to sensors that detect the rotational speed of the generator rotor of generator 20 and the angular position of the generator rotor. Controller 35 may then control the phase, frequency and magnitude of the rotor currents to provide electric power generation at the desired AC frequency.

The three-phase rotor windings 22 may in particular be excited with a fixed or a variable frequency, which provides the ability to control the rotor current state space vector independently from the mechanical position of the rotor. Accordingly, the electromagnetic field generated by the rotor windings 22 can be rotated at a speed that is different from the mechanical rotational speed of the generator rotor. By controlling the magnitude and the frequency of the rotor currents, it thus becomes possible to control the magnitude and the angular speed of the stator flux state space vector. Consequently, the torque and the stator AC frequency can be controlled in a wide operating window of the rotational speed of the generator rotor. It is in particular possible to significantly increase the AC frequency of the generated electrical power by providing a respective control of the currents in the rotor windings 22.

Additionally or alternatively, the frequency of the generated AC electrical power may be increased by changing the configuration of the generator 20. The frequency of the generated AC electrical power also depends on the number of poles of the generator. A conventional doubly-fed induction generator usually includes two or three pole pairs per phase, in order to generate the desired grid frequency of 50 Hz or 60 Hz at the nominal operating speed. In an embodiment, the generator 20 may include at least four pole pairs per phase. For example, it may include four, five, six or even more pole pairs per phase. A pole pair generally includes two pole windings. Accordingly, by providing such configuration of the generator 20, the frequency of the generated AC electrical power can be increased, thus allowing a more compact configuration of the generator 20. For a synchronous operating speed (zero slip, corresponding to a rotor voltage of zero frequency), the frequency f of the AC electrical power generated by the generator for a given mechanical rotational speed n and a number p of pole pairs is given by f=1/60 n*p (in Hz; rotational speed in rpm).

It should be clear that while in some embodiments, a generator with such higher pole number and the control of the rotor currents may be used in combination to achieve the higher AC frequency at the generator output, other embodiments may only employ control of the rotor currents.

During operation, the rotor windings 22 of the generator 20 likewise generate AC electrical power that is fed via the second converter 32 to the output 11. Again, it should be clear that intervening elements, such as circuit breakers, other protective equipment, step-up or step-down converters or the like can be connected between the second converter 32 and the output 11. Second converter 32 is thus configured as a bidirectional converter that provides a bidirectional power flow.

The first converter 31 may be implemented as a simple passive rectifier. In other embodiments, the converter 31 may be a controlled rectifier. Such controlled rectifier may for example employ semiconductor switches, in particular IGBTs, thyristors, MOSFETs or the like. First converter 31 may similarly be configured to provide a bidirectional power flow, for example for energizing the stator windings 21.

The fraction of the electrical power that is generated by generator 20 and passed through the first converter 31 may lie in the range of 65 to 85%. Typical values are 70% or 80%.

All of the electrical power generated by the generator 20 passes through a converter, either the first converter 31 or the second converter 32. Although higher losses may be associated with such configuration compared to a conventional DFIG solution, such losses are limited when providing DC electrical power at output 11. In particular, a conversion back to AC electrical power at the grid frequency may not need to be performed by the power generating system 10. Even further, such electrical losses are outweighed by the significant benefits achieved by operating the generator 20 at higher frequencies.

By such power generating system 10, it is possible to provide a DC collector grid at the wind power plant level. Significant cost-savings may be achieved for the generators.

Figure 2:
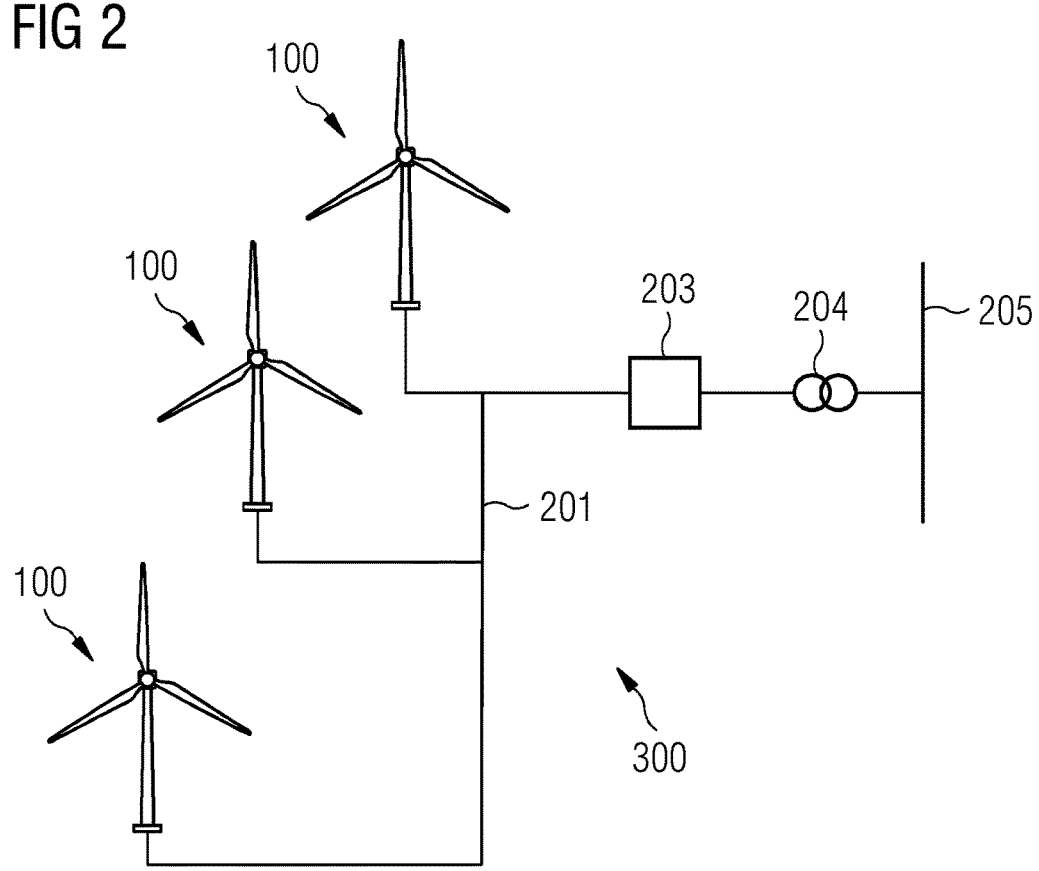
FIG. 2 is a schematic drawing showing a wind power plant according to an embodiment of the invention.

FIG. 2 shows a respective example of a wind power plant 300 that includes at least one, plural wind turbines 100. The output 11 of the power generating systems 10 of the individual wind turbines 100 are connected to a DC collector grid 201. A DC to AC converter 203 is provided. The DC to AC converter 203 is remote and distinct from the wind turbines 100 and may thus be termed "remote converter". The DC to AC converter 203 may provide a central conversion of the DC electrical power provided by the wind turbines 100, it may thus also be termed "central converter". The remote/central converter 203 is coupled to an AC power grid 205, which may for example be a utility grid, or may also be an island grid or the like. The coupling may be via a transformer 204. Electrical power generated by the wind turbines 100 can thus be fed efficiently into the AC power grid 205. An efficient wind power plant may thus be achieved, which further benefits from significant cost-savings for the generators provided in the wind turbines 100.

FIG. 3 is a flow-diagram illustrating a method according to an embodiment. In step S1, an AC to DC converter 31 is provided and is coupled to the stator of the generator 20. A bidirectional AC to DC converter 32 is provided in step S2 and is electrically coupled to the generator rotor of generator 20. The generator rotor is mechanically coupled to the wind turbine rotor 101 via the gearbox 102. In step S3, the power generating system is operated, wherein rotational mechanical power is received from the wind turbine 101 by the generator rotor. In step S4, the currents in the rotor windings 22 of the generator rotor are controlled by the second converter 32 such that an AC frequency of the generated AC electrical power is higher than 60 Hz. As outlined above, the AC frequency may for example lie within a range of 62 Hz to 500 Hz, 65 Hz to 400 Hz. The generated AC electrical power is converted in step S5 to DC electrical power by the converter 31 that is coupled to the stator of the generator. The DC electrical power is provided to the DC load 200. It should be clear that during the operation of the wind turbine, steps S3 to S5 may be performed continuously. Furthermore, it should also be clear that the method further includes the providing of AC electrical power generated by the rotor windings 22 of the generator 20 via the converter 31 to the DC load 200.

The method thus provides an efficient way of providing DC electrical power at the output 11 of the power generating system 10. As the generator 20 is operated at a higher output frequency of the generated AC electrical power, the generator 20 can have a smaller footprint and is more cost-efficient.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine electrical power generating system configured to supply generated electrical power to a main load, comprising:
    a wound rotor induction generator comprising stator windings and a generator rotor with rotor windings, wherein the generator rotor is configured to be mechanically coupled to a wind turbine rotor of the wind turbine to receive rotational mechanical energy;
    a first converter electrically coupled to the stator windings such that in operation, AC electrical power generated by the stator windings and provided to the main load passes through the first converter, wherein the first converter is an AC to DC converter that is configured to provide a conversion of the AC electrical power generated by the stator windings to DC electrical power; and
    a second converter electrically coupled to the rotor windings of the generator rotor, wherein an AC frequency of the generated AC electrical power is at least partially determined by setting or controlling currents in the rotor windings of the generator rotor by the second converter, wherein the second converter is configured to control a frequency of the currents in the rotor windings to control the AC frequency of the generated AC electrical power so that the AC frequency is higher than a grid frequency.

2. The wind turbine electrical power generating system according to claim 1, wherein the electrical power generating system is configured such that the AC frequency of the AC electrical power generated by the stator windings of the wound rotor induction generator is higher than 60 Hz.

3. The wind turbine electrical power generating system according to claim 1, wherein the AC frequency of the AC electrical power generated by the stator windings lies in a range of 62 Hz to 500 Hz.

4. The wind turbine electrical power generating system according to claim 1, wherein the power generating system is configured to control a speed and a magnitude of a stator flux state space vector of the stator by controlling a frequency and a magnitude of the currents in the generator rotor in dependence on the mechanical rotational speed of the generator rotor.

5. The wind turbine electrical power generating system according to claim 1, wherein the power generating system further comprising a controller that is coupled to or forms part of the second converter, the controller controlling semiconductor switches of the second converter in order to set or control the currents in the rotor windings.

6. The wind turbine electrical power generating system according to claim 1, wherein the first converter is a passive rectifier comprising diodes or is a controlled rectifier.

7. The wind turbine electrical power generating system according to claim 1, wherein the power generating system has an output for providing the generated electrical power to the main load, further wherein the output is a DC output that provides DC electrical power to the main load.

8. The wind turbine electrical power generating system according to claim 7, wherein the second converter is coupled between the wound rotor induction generator and the DC output.

9. The wind turbine electrical power generating system according to claim 7, wherein the DC output is coupled to a DC collector grid of a wind power plant.

10. The wind turbine electrical power generating system according to claim 1, wherein the main load comprises a remote DC to AC converter coupled to an output of the power generating system via a DC collector grid and coupled to an AC power grid.

11. The wind turbine electrical power generating system according to claim 1, wherein the wound rotor induction generator is configured such that at a nominal rotational speed of the wound rotor induction generator and synchronous operation, an AC frequency of the AC electrical power generated by the stator windings is higher than 60 Hz.

12. A wind power plant comprising:
  at least one wind turbine including a wind turbine electrical power generating system according to claim 1;
  a DC collector grid, wherein the first converter and the second converter of the wind turbine electrical power generating system are coupled to the DC collector grid; and
  an DC to AC converter that is remote from the at least one wind turbine and that is coupled between the DC collector grid and an AC power grid.

13. A method of operating a wind turbine electrical power generating system, the method comprising:
  generating AC electrical power by stator windings of a wound rotor induction generator that comprises the stator windings and a generator rotor with rotor windings, wherein the generator rotor is mechanically coupled to a wind turbine rotor of the wind turbine and receives rotational mechanical energy from the wind turbine rotor;
  providing the generated electrical power to a main load, wherein the generated AC electrical power passes through a first converter electrically coupled to the stator windings, wherein the first converter is an AC to DC converter that converts the AC electrical power generated by the stator windings to DC electrical power; and
  setting or controlling currents in the rotor windings of the generator rotor by a second converter electrically coupled to the rotor windings to at least partially determine an AC frequency of the generated AC electrical power, wherein the second converter is configured to control a frequency of the currents in the rotor windings to control the AC frequency of the generated AC electrical power so that the AC frequency is higher than a grid frequency.

14. The method according to claim 13, wherein the controlling is performed such that the AC frequency of the generated AC electrical power is higher than 60 Hz.

* * * * *